Nov. 10, 1964   C. S. SIMMONS   3,156,388
TOOL HOLDER
Filed Nov. 29, 1963   2 Sheets-Sheet 1

Charles S. Simmons
INVENTOR.
BY Llewellyn A. Young
His Attorney

Nov. 10, 1964   C. S. SIMMONS   3,156,388
TOOL HOLDER
Filed Nov. 29, 1963   2 Sheets-Sheet 2
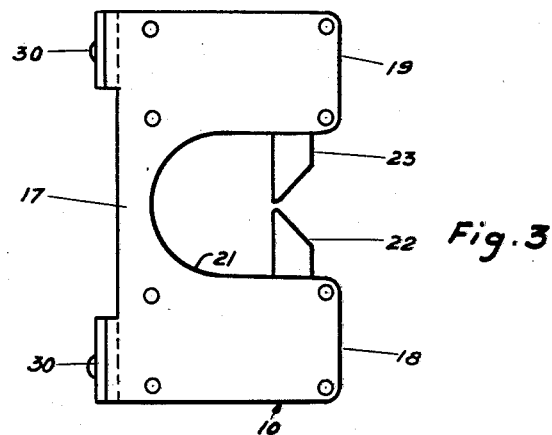
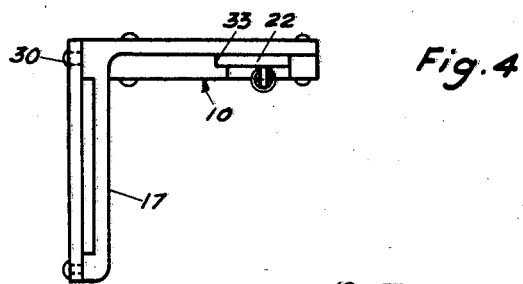
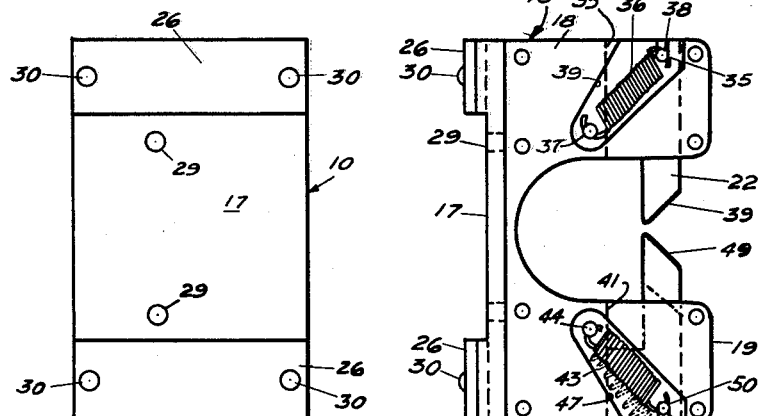
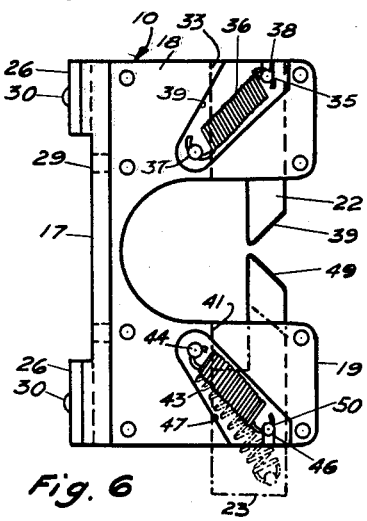
Charles S. Simmons
INVENTOR.
BY Llewellyn A. Young
His Attorney United States Patent Office 3,156,388
Patented Nov. 10, 1964

3,156,388
TOOL HOLDER
Charles S. Simmons, 600 15th St., Sparks, Nev.
Filed Nov. 29, 1963, Ser. No. 326,846
4 Claims. (Cl. 224—5)

This invention relates to a tool holder and more particularly to a holder for a tool of the type having a handle.

An object of the invention is the provision of a novel tool holder for a tool having a handle that permits the handle to be readily received in the holder and permits the user to readily remove the tool from the holder with simple, easy manual manipulations.

Another object of the invention is the provision of a novel tool holder for a tool having a handle that may be attached to the user's wearing apparel or some stationary object and still permit the ready acceptance or removal of a tool handle.

Another object of the invention is the provision of a novel tool holder that permits the ready acceptance and removal of a tool and that positively holds the tool in place so that injuries resulting from a falling tool is minimized, if not entirely eliminated.

Another object of the invention is the provision of a novel tool holder that is rugged, that is positive in its action, that is simple to construct, that is easy to use and that is inexpensive to produce.

Other objects and advantages of the invention will become apparent from the following detailed description taken in connection with the accompanying drawings in which:

FIGURE 3 is a top view of the holder without the tool in place.

FIGURE 4 is an end view of FIGURE 3.

FIGURE 5 is a side view of the holder.

FIGURE 6 is a bottom view of the holder.

Figure 2:
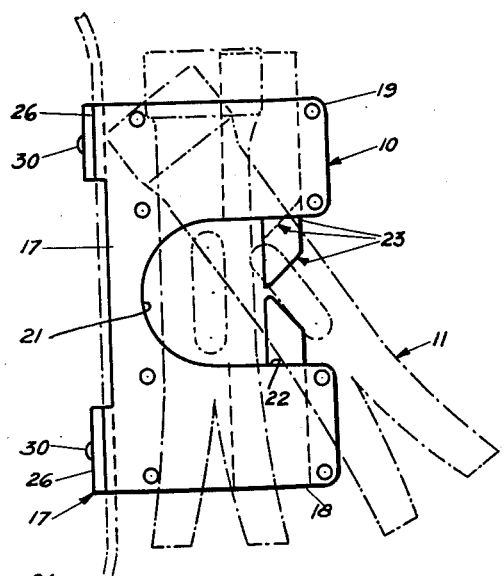
FIGURE 2 is a top view of FIGURE 1 showing the tool in different positions.
Figure 1:
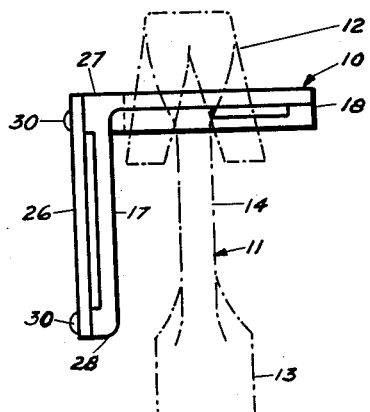
FIGURE 1 is an end view of a tool holder embodying the present invention holding a tool with a handle.

Referring now to the drawings, the invention is shown embodied in a tool holder 10 for holding a tool 11, in this case a hammer, having a head 12 and a handle 13. As shown, the head 12 is a conventional claw hammer head, and the handle 13 has a throat 14 having a cross-sectional area smaller than the portion of the handle 13 normally grasped by the user. It is to be understood that this holder may be used for other types of hammers, such as roofing hammers, machinists' hammers and other types of hammers or similar tools.

As shown, the holder 10 comprises a body 17, a pair of spaced ears 18 and 19 projecting outwardly from a body 17 to define a recess 21 for receiving the tool handle 13, tensioned jaws 22 and 23 in spaced relation to the body 17 and mounted on the ears 18 and 19, respectively, to retain the tool 11 in the recess 21 and operable upon a pressure applied to one side of one of the jaws to effect release of the tool.

The body herein is an elongated rectangular member which may be formed from metal or other suitable material. In this instance, the body is arranged to be attached to a belt 24 of a user. To do this, each end of the body is provided with a keeper 26. Each keeper is spaced from the body 17 by spacers 27 and 28 at the top and bottom of the body, respectively, and is secured to the body by rivets 30. Thus, it is seen that the body, the spacers 27 and 28 and the keeper 26 form a loop to receive the user's belt. Mounting holes 29 are provided at suitable positions on the body 17 where it is desired to mount the tool holder 10 directly on another object.

Herein, the ears 18 and 19 project outwardly from the top of the body 17. The ears 18 and 19 are spaced apart a sufficient distance to receive the tool handle 13. Where desired, the ears 18 and 19 may be preshaped to form recess 21 having a rounded configuration adjacent the body 17 as best seen in FIGURES 2, 3 and 6.

The jaw 22 is spaced from the body 17 and is mounted on the ear 18 to move between opposed position. In one position, the end of the jaw 22 spans substantially one-half (½) the distance across the recess 21. In its other position, the jaw 22 is arranged to be disposed within the ear 18 so that it does not obstruct the recess. To this end a slot 33 is formed in the ear 18 in substantially parallel relation to the body. The slot extends completely through the ear, opening into the recess 21. The slot 33 has a generally rectangular cross-section as shown (see FIGURE 4), and the jaw 22 has a generally rectangular cross-section of slightly smaller dimensions than the slot 33 to permit free movement of the jaw in the slot. A projection 38 is formed on the jaw 22 to be engageable with a shoulder 35 on the ear and determines the inner position of the jaw 22.

The jaw 22 is normally urged to its inner position by a spring 36 arranged to act between the body 17 and the jaw 22 to normally urge the jaw 22 to its inner position. As shown herein, the spring 36 is on the under side of the body 17. One end of the spring is attached to a projection 37 rigid with the ear, and the other end of the spring is attached to the depending projection 38 the jaw 22. As shown the spring 36 is disposed in a recess 39 formed in the ear 18 beneath the slot 33 and in connection therewith on the side away from the recess 21. As the jaw 22 moves between its opposed positions, the spring 36 moves radially about its anchor point 37 on the ear 18. To accommodate this movement, the recess 37 flares outwardly from a central position to the side of the ear away from the recess 21.

The end 39 of the jaw 22 is preshaped to have an angular surface facing outwardly from the recess 21 so that pressure applied to the surface 39, as by a user of the holder, causes the jaw to move into the slot 33 within the ear 18.

The jaw 23 is constructed similar to the jaw 22 and is mounted in a rectangular slot 41 in the ear 19. The slot is spaced from the body 17 and is arranged in the ear 19 so that the jaw 23, rectangular in cross-section but of smaller dimensions than the slot 41, is in end to end relation with the jaw 23 and spans approximately one-half (½) the distance across the recess 21. The jaw 23 moves between an inner position in which it is in closely spaced end to end relation with the jaw 22 and a position in which the jaw 23 is disposed in the slot 41 in the ear 19.

A spring 43 anchored at one end to a projection 44 on the ear 19 and at the other end to a projection 46 on the jaw 23 urges the jaw to its inner position. As is the case with the spring 36, the spring 43 is located in a recess 47 formed in the ear 19 beneath and in communication with the slot 41. The latter slot 41 also flares from a central position to the outer edge of the ear 19, as does the slot 37 previously described. The end 49 of the jaw 22 is also formed with an inclined surface so that a pressure applied to the surface causes the jaw 23 to move into the recess 41. The inner position of the jaw 23 is determined by engagement of the projection 46 with a shoulder 50 on the ear 19.

The operation of the holder is readily apparent but may be summarized as follows:

Assume that the holder has been mounted on a belt 24 as by threading a belt through the loops on each end of the tool holder body 17. The position of the parts of the holder are as shown in FIGURE 3. Assume it is desired to place a hammer 11 in the holder. The user of the hammer grasps the head 12 of the hammer and places the throat portion 14 of the handle against the inclined surfaces 39 and 49. Upon application of sufficient force, the jaws 22 and 23 are urged outwardly expanding the springs 36 and 43, and the handle 13 becomes disposed in the recess 21. After the handle clears the jaws 22 and 23, the springs 36 and 43 urge the jaws 22 and 23 to their normal end to end closely spaced relation forming a barrier at the front of the handle. By properly shaping the recess 21 with respect to the tool 11 being held, it can be seen that the tool 11 can not be pulled up as the handle engages the sides of the recess 21, and the head 12 prevents the pulling of the tool down through the recess and the jaws 22 and 23 prevent pulling the hammer through the front. Thus, the hammer is securely held. Workers below anyone using such a holder do not have to worry about a tool falling as it is positively held.

When the user desires to remove the hammer 11 from the holder, the user grasps the head 12 of the hammer 11 and applies a pressure with one of his fingers or thumb against the inclined surface 39 so as to force the jaw 22 into the ear 18. Simultaneously, the user rotates or rocks the handle 13 against the jaw 23. This causes the jaw 23 to disappear into the ear, and the handle can be released from the holder. If desired, the user can apply the pressure against the surface 49 to force the jaw 23 into the ear 19 and then rotate or rock the handle 13 against the jaw 22. This causes the jaw 22 to disappear into the ear, and the hammer can be released from the holder as described hereinbefore.

Where desired to use this holder on a stationary object, it is only necessary to attach the holder to the object by nails or other securing means driven through the holes 29 in the body 17. The holder operates in the manner previously described.

To insert the hammer 11, it is only necessary to place the handle against the jaws 22 and 23. With the pressure applied against the surfaces 39 and 49, the jaws 22 and 23 are urged into their respective slots, and the handle can clear the jaws. As soon as the handle is received in the recess, the springs 36 and 43 urge the jaws 22 and 23 to their closed position, and the tool is securely retained in the holder.

Thus, it will be seen that this holder is positive in its action. Further, it permits high efficiency in the ready use and disposal of a tool, is rugged and sturdy, is easy to use and minimizes the hazard of a falling tool on the job.

It is extremely important to have speed and efficiency on a job. Heretofore both hands of a tool user have been required to disposed of a tool. The construction herein permits the user to disposed of a tool and obtain a tool from a readily accessible place with one hand. This insures the safety of the user as he has one free hand to do any other chore required. The holder is designed so that the only way the hammer can be removed is by pushing the retaining jaws to their recessed position.

I claim:

1. In a tool holder for a tool having a handle, the combination of a body, spaced ears projecting outwardly from said body to define an opening to receive the tool handle, each of said ears having a slot in communication with said opening, a plunger in each of said slots, each plunger being movable between two positions, in one position said plungers being in end to end closely spaced relation and in said other positions said plungers being in end to end spaced apart relation to permit removal and acceptance of a tool handle, a spring means acting between each plunger and said body urging said plunger to said closely spaced end to end relation at least one of said plungers having a surface whereby a pressure against said surface causes said plunger to move to its other position.

2. In a holder for a tool having a handle, the combination of a body, a first ear projecting outwardly from said body and having a slot opening on one side of said body, said body having a second slot beneath said first slot and opening on the other side of said ear, a second ear projecting outwardly from said body and spaced from said first ear to define a recess to receive said tool handle, said second ear having a slot opening on the side facing said first ear and having a second slot below said first slot and opening on the other side of said second ear, a first plunger in said first ear movable between a position in which an end of said plunger spans approximately one-half (½) the distance between said first and second ears in a position in which said end is disposed in said solt in said ear, spring means disposed in said second slot and arranged to urge said plunger to said first position, a second plunger in said second slot in said second ear movable between a position in which the end of said plunger spans approximately one-half the distance between said first and second ears and a position in which said end of the second plunger is disposed within said ear to permit the reception or taking out of a tool.

3. The combination recited in claim 2 in which an end of each plunger is removed to form a surface whereby a pressure applied against said surface causes said plunger to be moved between said first and second positions.

4. The combination recited in claim 2 in which said body is formed with means for fastening said body to another object.

References Cited by the Examiner
UNITED STATES PATENTS

| | | | |
|---|---|---|---|
| 243,898 | 7/81 | Hill | 211—60 |
| 658,042 | 9/00 | Mendel | 211—74 X |
| 1,081,261 | 12/13 | Barrett | 24—3 |
| 1,282,753 | 10/18 | Carmalho | 211—68 |
| 1,588,553 | 6/26 | Teaford | 24—221 |

HUGO O. SCHULZ, *Primary Examiner.*